(12) United States Patent
Shimono et al.

(10) Patent No.: US 8,876,224 B2
(45) Date of Patent: Nov. 4, 2014

(54) VEHICULAR BRAKE FLUID PRESSURE CONTROL APPARATUS

(75) Inventors: Takuyo Shimono, Ueda (JP); Masaya Shigeta, Ueda (JP)

(73) Assignee: Nissin Kogyo Co., Ltd, Nagano (JP)

( * ) Notice: Subject to any disclaimer, the term of this patent is extended or adjusted under 35 U.S.C. 154(b) by 40 days.

(21) Appl. No.: 13/464,176

(22) Filed: May 4, 2012

(65) Prior Publication Data
US 2012/0285555 A1    Nov. 15, 2012

(30) Foreign Application Priority Data

May 10, 2011   (JP) ................................. 2011-105530

(51) Int. Cl.
*B60T 8/36*    (2006.01)
*B60T 8/66*    (2006.01)

(52) U.S. Cl.
CPC ........................................ *B60T 8/36* (2013.01)
USPC ......... 303/119.1; 303/156; 303/157; 303/158

(58) Field of Classification Search
None
See application file for complete search history.

(56) References Cited

U.S. PATENT DOCUMENTS

| | | | | |
|---|---|---|---|---|
| 6,322,164 B1 * | 11/2001 | Sakamoto et al. | ......... | 303/115.4 |
| 6,345,869 B1 * | 2/2002 | Matsuo et al. | ............. | 303/116.1 |
| 8,256,849 B2 * | 9/2012 | Kokubo | ..................... | 303/119.1 |
| 2010/0066164 A1 * | 3/2010 | Kokubo | ......................... | 303/191 |
| 2011/0215638 A1 * | 9/2011 | Sakuma | ........................... | 303/11 |
| 2013/0089438 A1 * | 4/2013 | Tanuma | ........................... | 417/46 |

FOREIGN PATENT DOCUMENTS

| | | |
|---|---|---|
| JP | 08034330 | 2/1996 |
| JP | 11129876 | 5/1999 |
| JP | 2009184587 | 8/2009 |
| JP | 2010042702 | 2/2010 |

OTHER PUBLICATIONS

Japanese Patent Office Action for Application No. 2011-105530, drafting date—May 8, 2013, 6 pages total.

* cited by examiner

*Primary Examiner* — Thomas Irvin
(74) *Attorney, Agent, or Firm* — Andrew M. Calderon; Roberts Mlotkowski Safran & Cole, P.C.

(57) ABSTRACT

A vehicular brake fluid pressure control apparatus includes: normally open and normally closed electromagnetic valves disposed to correspond to plural wheel brakes; and a control unit which controls fluid pressures transmitted to the wheel brakes by controlling drive currents applied to the electromagnetic valves according to plural different fluid pressure control modes. The control unit controls the normally closed electromagnetic valves while switching, according to which of the fluid pressure control modes is effective, between a responsivity priority control in which drive currents applied to the normally closed electromagnetic valves are increased to a target current value instantaneously at a first slope, a silence priority control in which the drive currents are increased at a second slope gentler than the first slope, and an intermediate control in which the drive currents are increased at a third slope gentler than the first slope and steeper than the second slope.

18 Claims, 9 Drawing Sheets

FIG. 6

| FLUID PRESSURE CONTROL MODE | F |
|---|---|
| BRAKE ASSIST CONTROL | 0 |
| VEHICLE BEHAVIOR CONTROL | 0 |
| AUTOMATIC BRAKE CONTROL | 1 |
| AUTOMATIC HOLD CONTROL | 1 |
| INITIAL DIAGNOSIS CONTROL | 2 |
| CAVITATION ELIMINATION CONTROL | 2 |

VEHICULAR BRAKE FLUID PRESSURE CONTROL APPARATUS

CROSS REFERENCE TO RELATED APPLICATION(S)

The present disclosure relates to the subject matters contained in Japanese Patent Application No. 2011-105530 filed on May 10, 2011, which are incorporated herein by reference in its entirety.

FIELD

The present invention relates to a vehicular brake fluid pressure control apparatus which is equipped with normally open electromagnetic valves and normally closed electromagnetic valves.

BACKGROUND

A vehicular brake fluid pressure control apparatus capable of reducing, maintaining, and increasing the fluid pressures of wheel brakes by controlling plural electromagnetic valves is known in which pressure adjusting values and inlet valves are normally open electromagnetic valves and outlet valves and suction valves are normally closed electromagnetic valves (refer to JP-A-2009-184587). The normally open electromagnetic valves are configured so as to be able to adjust the differential pressure between an upstream fluid and a downstream fluid according to a drive current and the normally closed electromagnetic valves are configured so as to be able to perform open/close switching by on/off-controlling a drive current.

Incidentally, in the normally closed electromagnetic valves which are configured so as to perform open/close switching by on/off-controlling the drive current, a valve plug is moved fast in an opening or closing operation and hence a hammering sound that is generated because of a movement of the valve plug causes greater influence than in the normally open electromagnetic valves. During a brake fluid pressure control that is performed when the driver is making a brake manipulation, such hammering sounds of the normally closed electromagnetic valves would not make the driver feel uncomfortable because he or she can recognize the reason for the hammering sounds (brake assist control or the like). However, if the normally closed electromagnetic valves operate while the driver is not making a brake manipulation (e.g., during a diagnosis of the brake fluid pressure control apparatus), the driver may feel uncomfortable about resulting hammering sounds because he or she does not expect them.

SUMMARY

An object of an embodiment of the present invention is therefore to provide a vehicular brake fluid pressure control apparatus capable of suppressing hammering sounds that are generated by normally closed electromagnetic valves in a situation that the driver cannot recognize a reason for them.

According to an aspect of the embodiment, there is provided a vehicular brake fluid pressure control apparatus including: plural normally open electromagnetic valves and plural normally closed electromagnetic valves which are disposed so as to correspond to plural wheel brakes; and a control unit which controls fluid pressures transmitted to the wheel brakes by controlling drive currents applied to at least part of the electromagnetic valves according to plural different fluid pressure control modes, wherein the control unit controls the at least part of the normally closed electromagnetic valves while switching, according to which of the fluid pressure control modes is effective, between a responsivity priority control in which drive currents applied to the at least part of the normally closed electromagnetic valves are increased to a target current value instantaneously at a first slope; a silence priority control in which the drive currents applied to the at least part of the normally closed electromagnetic valves are increased at a second slope which is gentler than the first slope; and an intermediate control in which the drive currents applied to the at least part of the normally closed electromagnetic valves are increased at a third slope which is gentler than the first slope and steeper than the second slope.

According to another aspect of the embodiment, there is provided a vehicular brake fluid pressure control apparatus including plural normally open electromagnetic valves and plural normally closed electromagnetic valves which are disposed so as to correspond to plural wheel brakes; and a control unit which controls fluid pressures transmitted to the wheel brakes by controlling drive currents applied to the at least part of the electromagnetic valves according to plural different fluid pressure control modes, wherein the control unit controls the normally closed electromagnetic valves while switching, according to which of the fluid pressure control modes is effective, between a responsivity priority control in which drive currents applied to the at least part of the normally closed electromagnetic valves are decreased to a target current value instantaneously at a first slope; a silence priority control in which the drive currents applied to the at least part of the normally closed electromagnetic valves are decreased at a second slope which is gentler than the first slope; and an intermediate control in which the drive currents applied to the at least part of the normally closed electromagnetic valves are decreased at a third slope which is gentler than the first slope and steeper than the second slope.

The term "first slope" includes a slope of an instantaneous rise or fall that is approximately perpendicular to the time axis.

In the aspects, switching is made between the responsivity priority control, the silence priority control, and the intermediate control according to what fluid pressure control mode is effective. Therefore, for example, higher priority can be given to responsivity in a fluid pressure control mode that is high in emergency level. In a running state in which the driver does not perform a brake manipulation (the driver cannot recognize a reason for hammering sounds) and high responsivity is not required, the normally closed electromagnetic valves are opened (or closed) silently and hence hammering sounds can be suppressed.

In the vehicular brake fluid pressure control apparatus, pumps for increasing the fluid pressures in the wheel brakes and a master cylinder may be provided further and the normally closed electromagnetic valves may be suction valves which are disposed between the master cylinder and suction sides of the pumps, respectively.

According to this, the suction valves can be opened (or closed) slowly and silently to, for example, eliminate cavitation occurring between the pumps and the suction valves. Therefore, hammering sounds that are not expected by the driver can be suppressed.

In the vehicular brake fluid pressure control apparatus, in each of the silence priority control and the intermediate control, the control unit may increase the drive currents gradually in a prescribed operating current range in which the normally closed electromagnetic valves are supposed to be opened and increase the drive currents instantaneously outside the prescribed operating current range.

According to this, hammering sounds can be suppressed while high responsivity is secured because the period in which the drive currents are increased gradually to a minimum necessary period.

In the vehicular brake fluid pressure control apparatus, the control unit may increase the drive currents stepwise in the prescribed operating current range.

According to this, hammering sounds can be suppressed more than in a case of increasing the drive currents linearly because the valve plugs can be moved with lower acceleration.

In the vehicular brake fluid pressure control apparatus, the control unit may perform the responsivity priority control if the current fluid pressure control mode is a brake assist control mode for increasing fluid pressures exerted on the wheel brakes at the time of emergency braking or a vehicle behavior control mode for stabilizing vehicle behavior.

According to this, higher priority can be given to responsivity if the current fluid pressure control mode is a mode that is high in emergency level such as the brake assist control mode.

In the vehicular brake fluid pressure control apparatus, the control unit may perform the silence priority control if the current fluid pressure control mode is an initial diagnosis control mode for checking the operations of the components of the vehicular brake fluid pressure control apparatus or a cavitation elimination control mode for eliminating cavitation occurring between the pumps and the suction valves.

According to this, higher priority is given to silence over responsivity if the current fluid pressure control mode is a mode in which control is performed automatically with no brake manipulation by the driver, such as the initial diagnosis control mode. Therefore, hammering sounds that are not expected by the driver are suppressed, whereby the driver is prevented from feeling uncomfortable about hammering sounds.

In the vehicular brake fluid pressure control apparatus, the control unit may perform the intermediate control if the current fluid pressure control mode is an automatic brake control mode in which control is performed according to the distance to the vehicle ahead or an automatic hold control mode for automatically holding fluid pressures exerted on the wheel brakes while the vehicle is stopped.

According to this, a good control in which responsivity and silence are well balanced can be performed in the case where the current fluid pressure control mode is such a mode as the automatic brake control mode in which the emergency level is lower than in the brake assist control mode and higher than in the initial diagnosis control mode.

According to the embodiment, hammering sounds that are generated by normally closed electromagnetic valves can be suppressed in a situation that the driver cannot recognize a reason for them.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

FIG. 6 shows a map showing a relationship between plural fluid pressure control modes and values of a control method variable.

DETAILED DESCRIPTION OF THE EMBODIMENTS

Figure 1:
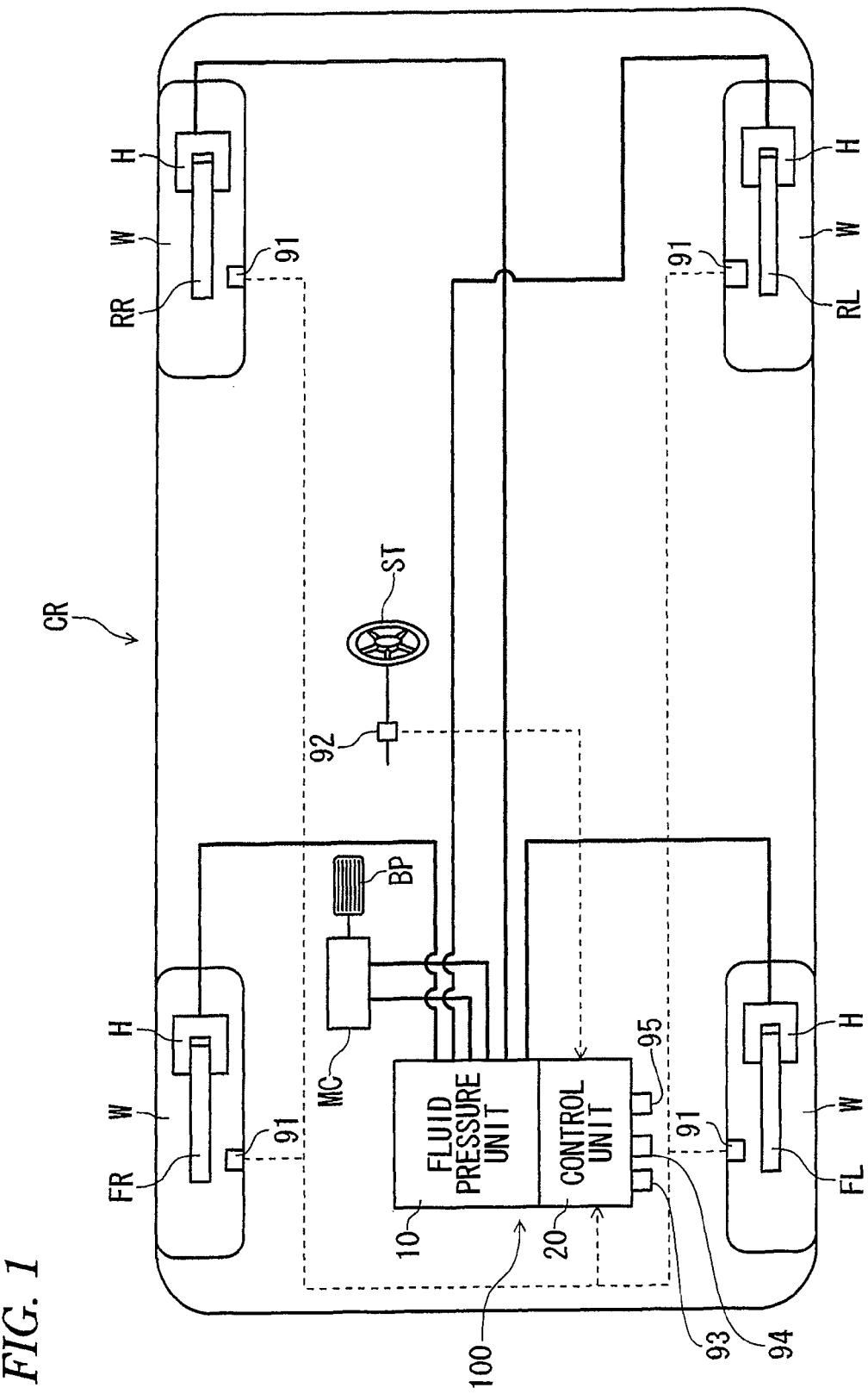
FIG. 1 shows the configuration of a vehicle which is equipped with a vehicular brake fluid pressure control apparatus according to an embodiment of the present invention.

An embodiment of the present invention will be hereinafter described in detail by referring to the drawings when necessary.

As shown in FIG. 1, a vehicular brake fluid pressure control apparatus 100 which controls braking force (brake fluid pressure) to be exerted on each of wheels W of a vehicle CR is equipped with a fluid pressure unit 10 having fluid passages (fluid pressure passages) and various components and a control unit 20 for controlling the various components of the fluid pressure unit 10 as appropriate.

The control unit 20, which is equipped with, for example, a CPU, a RAM, a ROM, and input and output circuits, performs controls by performing various kinds of computation processing based on inputs from wheel speed sensors 91, a steering angle sensor 92, a lateral acceleration sensor 93, a yaw rate sensor 94, and a front-rear acceleration sensor 95 and programs and data stored in the ROM.

The wheel speed sensors 91 are sensors for detecting wheel speeds of the respective wheels W and are provided for the respective wheels W. The steering angle sensor 92 is a sensor for detecting a steering angle of a steering wheel ST and is attached to a rotary shaft of the steering wheel ST.

The lateral acceleration sensor 93 is a sensor for detecting acceleration in the lateral direction (lateral acceleration) of the vehicle CR and is provided in the control unit 20. The yaw sensor 94 is a sensor for detecting a turning angular velocity (actual yaw rate) of the vehicle CR and is provided in the control unit 20.

The front-rear acceleration sensor 95 is a sensor for detecting acceleration in the front-rear direction (front-rear acceleration) of the vehicle CR and is provided in the control unit 20.

Wheel cylinders H are fluid pressure apparatuses for converting brake fluid pressures generated by a master cylinder MC and the vehicular brake fluid pressure control apparatus 100 into operating forces for wheel brakes FR, FL, RR, and RL provided in the wheels W, respectively. The wheel cylinders H are connected to the fluid pressure unit 10 of the vehicular brake fluid pressure control apparatus 100 by respective pipes.

Figure 2:
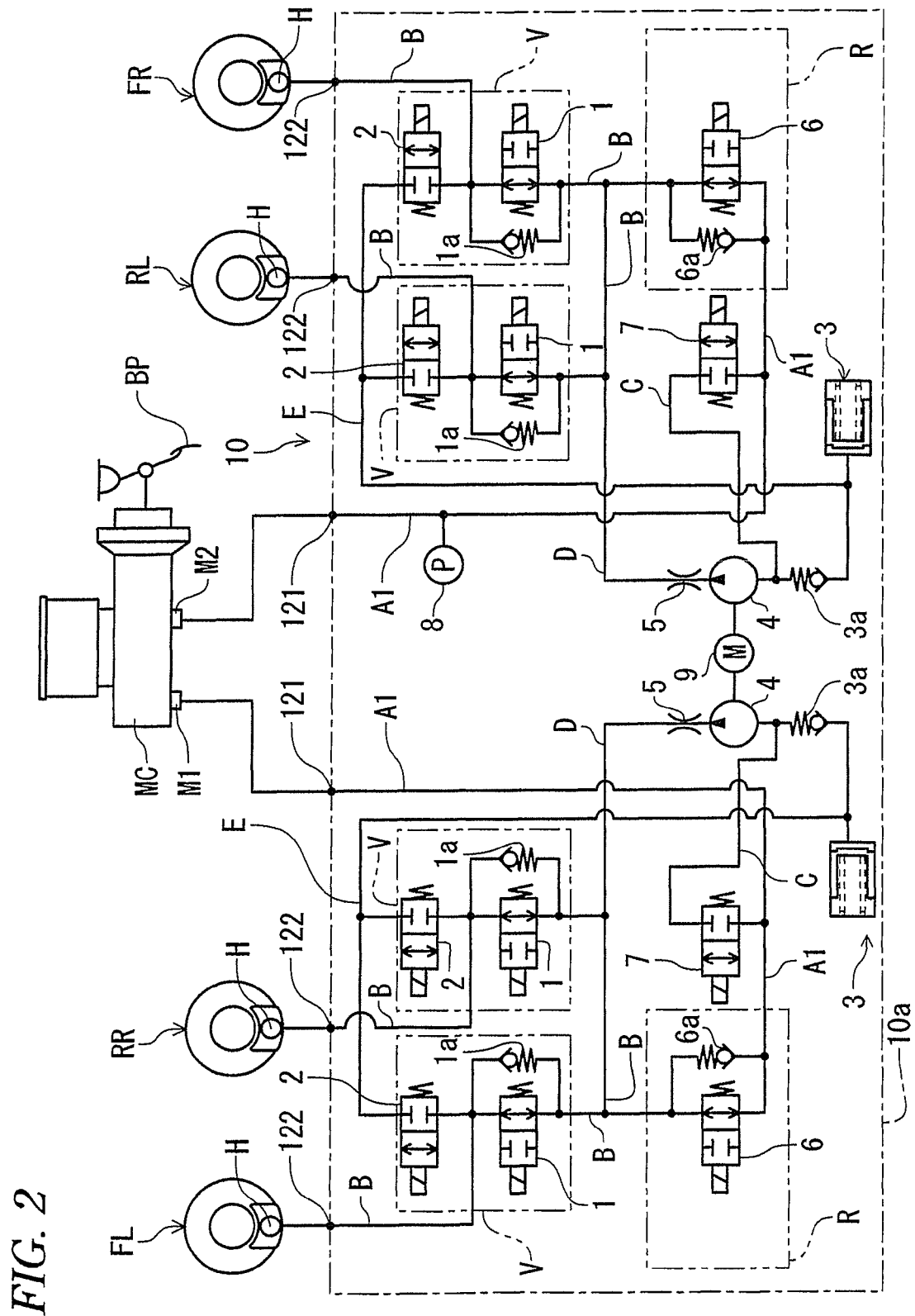
FIG. 2 shows the configuration of a fluid pressure circuit of the vehicular brake fluid pressure control apparatus.

As shown in FIG. 2, the fluid pressure unit 10 is provided between the master cylinder MC which is a fluid pressure source for generating brake fluid pressure according to stepping force exerted on a brake pedal BP by the driver and the wheel brakes FR, FL, RR, and RL. The fluid pressure unit 10 is composed of a pump body 10*a* which is a base body having fluid passages through which brake fluid flows, plural inlet valves 1 and outlet valves 2 provided in the fluid passages, and other components.

Two output ports M1 and M2 of the master cylinder MC are connected to respective inlet ports 121 of the pump body 10*a*, and outlet ports 122 of the pump body 10*a* are connected to the respective wheel brakes FR, FL, RR, and RL. In an ordinary state, continuous fluid passages are formed between each inlet port 121 of the pump body 10*a* and the associated outlet ports 122, whereby stepping force exerted on the brake pedal BP is transmitted to the wheel brakes FR, FL, RR, and RL.

The fluid passages starting from the output port M1 reach the front-left wheel brake FL and the rear-right wheel brake RR, and the fluid passages starting from the output port M2 reach the front-right wheel brake FR and the rear-left wheel brake RL. In the following, the fluid passages starting from the output port M1 will be referred to as a first fluid passage system and the fluid passages starting from the output port M2 will be referred to as a second fluid passage system.

In the fluid pressure unit 10, the first fluid passage system is provided with two control valve means V which correspond to the respective wheel brakes FL and RR and, likewise, the second fluid passage system is provided with two control valve means V which correspond to the respective wheel brakes RL and FR. In the fluid pressure unit 10, each of the first fluid passage system and the second fluid passage system is equipped with a reservoir 3, a pump 4, an orifice 5, a pressure adjusting valve (regulator) R, and a suction valve 7 as a normally closed electromagnetic valve according to the invention. The fluid pressure unit 10 is further equipped with a common motor 9 for driving the respective pumps of the first fluid passage system and the second fluid passage system. In the embodiment, only the second fluid passage system is provided with a pressure sensor 8.

In the following, the fluid passage from each of the output ports M1 and M2 of the master cylinder MC to the associated pressure adjusting valve R will be referred to as an output fluid pressure passage A1. The fluid passages from the pressure adjusting valve R of the first fluid passage system to the wheel brakes FL and RR will be referred to as wheel fluid pressure passages B, and the fluid passages from the pressure adjusting valve R of the second fluid passage system to the wheel brakes RL and FR will also be referred to as wheel fluid pressure passages B. The fluid passage from each output fluid pressure passage A1 to the associated pump 4 will be referred to as a suction fluid pressure passage C. The fluid passage from each pump 4 to the associated wheel fluid pressure passages B will be referred to as a discharge fluid pressure passage D. The fluid passage from each pair of wheel fluid pressure passages B to the associated suction fluid pressure passage C will be referred to as an escape passage E.

Each control valve means V is a valve for controlling the transmission of fluid pressure between the side of the master cylinder MC or the associated pump 4 and the side of the associated wheel brake FL, RR, RL, or FR (more specifically, wheel cylinder H), and can increase, maintain, or reduce the pressure of the associated wheel cylinder H. To this end, each control valve means V is composed of an inlet valve 1, an outlet valve 2, and a check valve 1*a*.

The inlet valve 1 is a normally open electromagnetic valve disposed between the associated wheel brake FL, RR, RL, or FR and the master cylinder MC, that is, in the associated wheel fluid pressure passage B. Being open in an ordinary state, the inlet valve 1 permits transmission of brake fluid from the master cylinder MC to the associated wheel brake FL, RR, RL, or FR. When the associated wheel W is about to be locked, the inlet valve 1 is closed by the control unit 20 and thereby prohibits the transmission of brake fluid from the brake pedal BP to the associated wheel brake FL, RR, RL, or FR.

The outlet valve 2 is a normally closed electromagnetic valve disposed between the associated wheel brake FL, RR, RL, or FR and the associated reservoir 3, that is, between the associated wheel fluid pressure passage B and the escape passage E. The outlet valve 2 is closed in an ordinary state. When the associated wheel W is about to be locked, the outlet valve 2 is opened by the control unit 20 and thereby causes brake fluid pressure acting on the associated wheel brake FL, RR, RL, or FR to escape to the associated reservoir 3.

The check valve 1*a* is connected to the associated inlet valve 1 in parallel. The check valve 1*a* is a unidirectional valve which allows brake fluid to flow only in the direction from the associated wheel brake FL, RR, RL, or FR to the master cylinder MC. The check valve 1*a* permits inflow of brake fluid from the side of the associated wheel brake FL, RR, RL, or FR to the side of the master cylinder MC when an input from the brake pedal BP is canceled even if the associated input valve 1 is closed.

Each reservoir 3 is connected to the associated escape passage E and has a function of absorbing brake fluid pressure that is to escape when an associated outlet valve 2 is opened. A check valve 3*a* is disposed between an associated reservoir 3 and pump 4 to permit flow of brake fluid only in the direction from the reservoir 3 to the pump 4.

Each pump 4 is disposed between the associated suction fluid pressure passage C which is connected to the associated output fluid pressure passage A1 and the discharge fluid pressure passage D which is connected to the associated wheel fluid pressure passages B, and has a function of absorbing brake fluid stored in the associated reservoir 3 and discharges it to the associated discharge fluid pressure passage D. With this measure, brake fluid that has been absorbed by each reservoir 3 can be returned to the master cylinder MC and braking force can be exerted on the associated wheel brakes FL and RR or RL and FR by generating brake fluid pressure even if the driver does not manipulate the brake pedal BP.

The amount of brake fluid discharged from the each pump 4 depends on the rotation speed of the motor 9 and, for example, is increased as the rotation speed of the motor 9 increases.

Each orifice 5 attenuates a pressure ripple of brake fluid that is discharged from the associated pump 4.

Being open in an ordinary state, each pressure adjusting valve R allows brake fluid to flow the associated output fluid pressure passage A1 to the associated wheel fluid pressure passages B. Each pressure adjusting valve R also has the following function. When the pressure on the side of the associated wheel cylinders H is increasing due to brake fluid pressure generated by the associated pump 4, each pressure adjusting valve R adjusts the pressure on the side of the associated discharge fluid pressure passage D, wheel fluid pressure passages B, and wheel cylinders H so that it becomes lower than or equal to a setting value while interrupting flow of brake fluid. To this end, each pressure adjusting valve R is equipped with a switching valve 6 and a check valve 6*a*.

The switching valve 6 is a normally open linear solenoid valve which is disposed between the associated output fluid pressure passage A1 which is connected to the master cylinder MC and the associated wheel fluid pressure passages B which are connected to the wheel brakes FL and RR or RL and FR. Although not illustrated in detail, the valve plug of the switching valve 6 is urged toward the side of the associated wheel fluid pressure passages B and wheel cylinders H by electromagnetic force corresponding to a current applied. When the pressure of the associated wheel fluid pressure passages B has become higher than that of the associated output fluid pressure passage A1 by a prescribed value (determined by the current applied), brake fluid escapes from the associated wheel fluid pressure passages B to the associated output fluid pressure passage A1 through the switching valve 6 and the pressure of the associated wheel fluid pressure passages B is thereby adjusted to a prescribed pressure.

The check valve 6a is connected to the associated switching valve 6 in parallel. The check valve 6a is a unidirectional valve which allows brake fluid to flow from the associated output fluid pressure passage A1 to the associated wheel fluid pressure passages B.

Each suction valve 7 is a normally closed electromagnetic valve disposed in the suction fluid pressure passage C, and switches between a state that the suction fluid pressure passage C is passable and a state that it is closed. Each suction valve 7 is opened by the control unit 20 when the switching valve 6 is closed, that is, when brake fluid pressure is exerted on the associated wheel brakes FL and RR or RL and FR though the driver is not manipulating the brake pedal BP.

The pressure sensor 8 detects brake fluid pressure of the output fluid pressure passage A1 of the second system, and a detection result is input to the control unit 20.

Next, the control unit 20 will be described in detail.

The control unit 20 controls the operations of the wheel brakes FL, RR, RL, and FR by controlling the opening/closing operations of the control valve means V, the switching valves 6 (pressure adjusting valves R), and the suction valves 7 in the fluid pressure unit 10 and the operation of the motor 9 based on, for example, signals that are input from the sensors 91-95 and 8 etc. In other words, the control unit 20 controls the fluid pressures transmitted to the wheel brakes FL, RR, RL, and FR by controlling the drive currents applied to the respective electromagnetic valves depending on which of plural different fluid pressure control modes such as a brake assist control and an automatic brake control is effective.

In the embodiment, it is assumed that the plural fluid pressure control modes are a brake assist control mode, a vehicle behavior control mode, an automatic brake control mode, an automatic hold control mode, an initial diagnosis control mode, and a cavitation elimination control mode. The brake assist control is a control for increasing the fluid pressures exerted on the wheel brakes FL, RR, RL, and FR at the time of emergency braking. The vehicle behavior control is such a control as an ABS control or a traction control for stabilizing the behavior of the vehicle CR.

The automatic brake control is such a control as an auto cruise control for automatically increasing the fluid pressures exerted on the wheel brakes FL, RR, RL, and FR according to the distance to the vehicle ahead. The automatic hold control is a control for automatically maintaining the fluid pressures exerted on the wheel brakes FL, RR, RL, and FR while the vehicle CR is stopped. The initial diagnosis control is a control for checking the operations of the components of the vehicular brake fluid pressure control apparatus 100 while the vehicle CR is running. The cavitation elimination control is a control for eliminating cavitation occurring between the pumps 4 and the respective suction valves 7.

The control unit 20 is configured so as to switch the control method of the suction valves 7 between a responsivity priority control in which higher priority is given to responsivity, a silence priority control in which higher priority is given to silence, and an intermediate control in which responsivity and silence are balanced according to what fluid pressure control mode is effective. The responsivity priority control is a control in which the drive currents of the suction valves 7 are increased or decreased to a target current value (C1 or 0) instantaneously at a first slope as indicated by solid lines in FIGS. 3A and 4A.

Figure 3A:
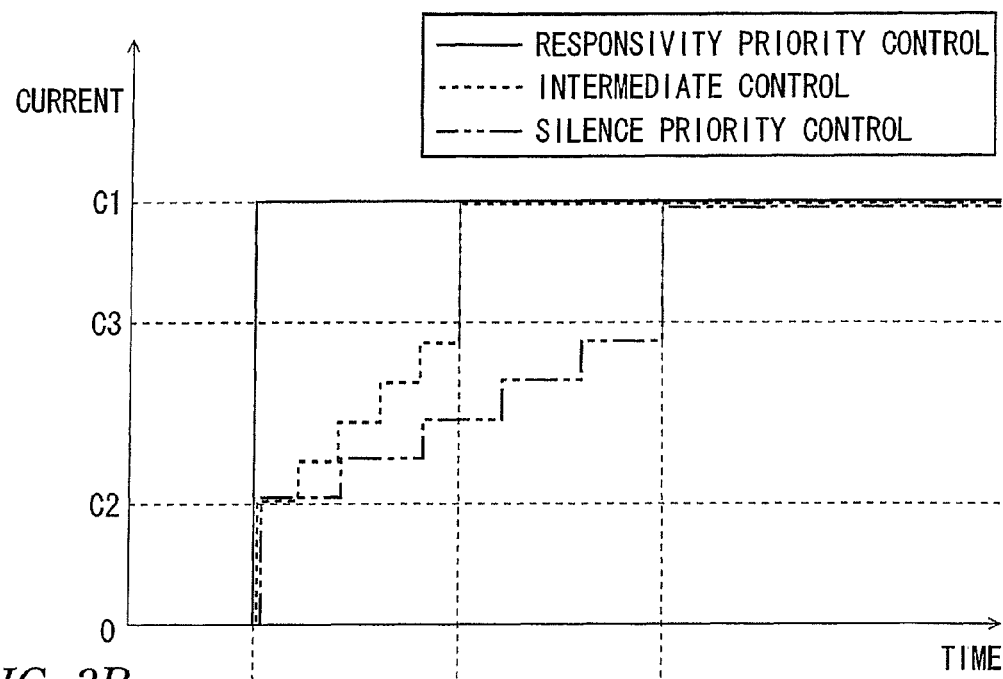
FIGS. 3A and 3B are graphs showing how the drive currents of suction valves are varied and how the suction valves are opened in different control methods.
Figure 4A:
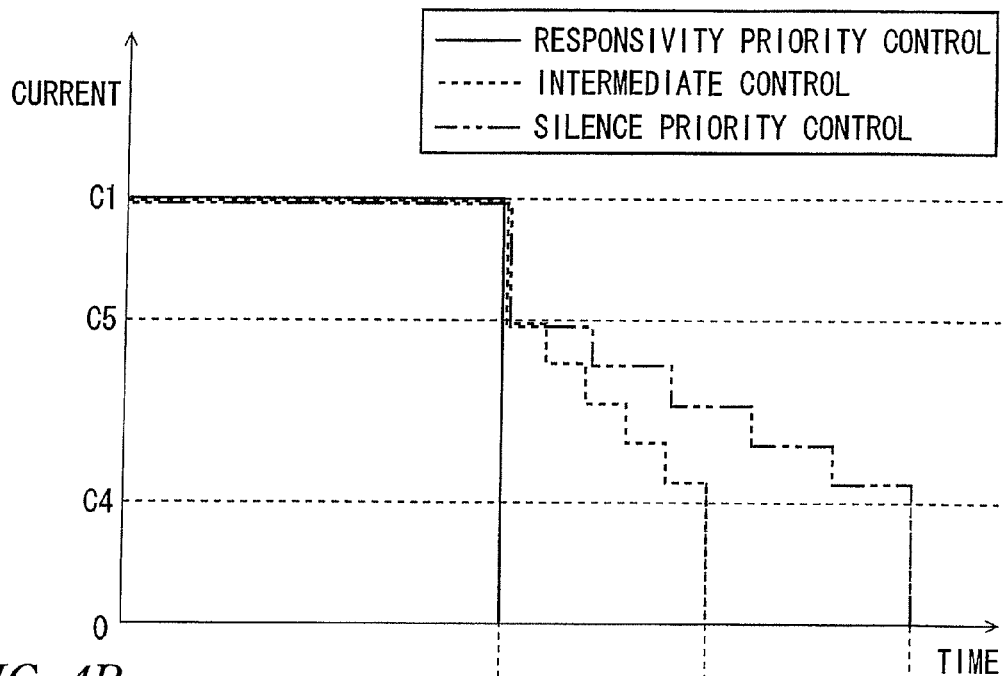
FIGS. 4A and 4B are graphs showing how the drive currents of the suction valves are varied and how the suction valves are closed in the different control methods.

The silence priority control is a control in which the drive currents of the suction valves 7 are increased or decreased to a target current value at a second slope (an average slope in a prescribed operating current range C2-C3 or C4-C5) which is gentler than the first slope as indicated by two-dot chain lines in FIGS. 3A and 4A. The operating current range C2-C3 is a current range where the suction valves 7 are supposed to be opened when the drive currents are increased from 0, and the operating current range C4-C5 is a current range where the suction valves 7 are supposed to be closed when the drive currents are decreased from C1. Each operating current range C2-C3 or C4-C5 can be determined as appropriate by an experiment, a simulation, or the like.

The intermediate control is a control in which the drive currents of the suction valves 7 are increased or decreased to a target current value at a third slope (an average slope in the operating current range C2-C3 or C4-C5) which is gentler than the first slope and steeper than the second slope as indicated by broken lines in FIGS. 3A and 4A.

The control unit 20 is configured so as to increase or decrease the drive currents gradually in the operating current range C2-C3 or C4-C5 and increase or decrease the drive currents instantaneously outside the operating current range C2-C3 or C4-C5 in each of the silence priority control and the intermediate control mode. With this measure, high responsivity can be secured by shortening the period in which the drive currents are increased or decreased gradually to a minimum necessary period.

Furthermore, in each of the silence priority control and the intermediate control mode, the control unit 20 increases or decreases the drive currents stepwise in the operating current range C2-C3 or C4-C5. Increasing or decreasing the drive currents stepwise makes it possible to move the valve plugs of the suction valves 7 with lower acceleration and hence to make hammering sounds weaker than in the case where the drive currents are increased or decreased at a fixed slope.

The term "stepwise" as used above means that the drive currents are stepwisely increased or decreased by repeating a set of level holding and increase or decrease.

Figure 5:
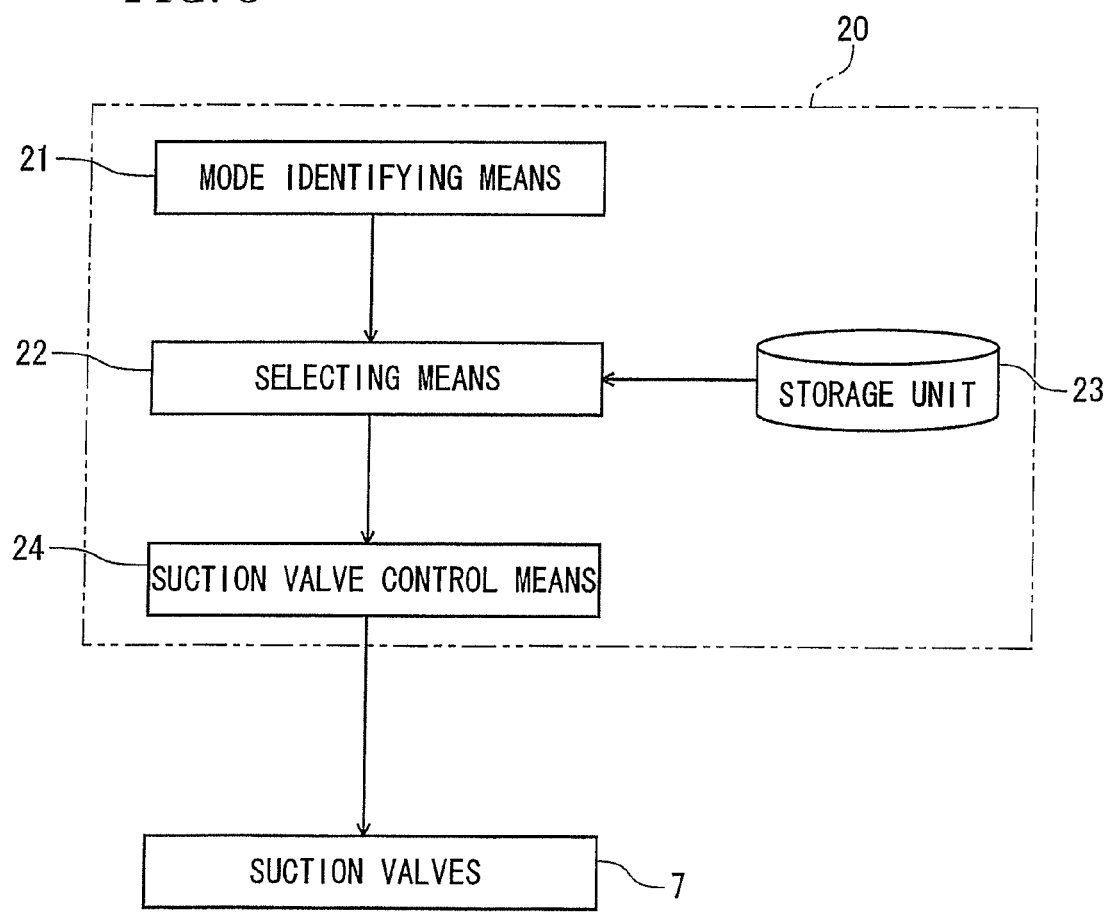
FIG. 5 is a block diagram showing the configuration of a control unit.

As shown in FIG. 5, the control unit 20 which performs the above-described controls is equipped with a mode identifying means 21, a selecting means 22, a storage unit 23, and a suction valve control means 24. The controls of the valves (including the control valve means V) other than the suction valves 7 in each fluid pressure control mode are known and hence will not be described in detail below.

The mode identifying means 21 is configured so as to recognize which of the modes listed in a map of FIG. 6 the current fluid pressure control mode of the control unit 20 is. The mode identifying means 21 outputs information of the identified mode to the selecting means 22. For example, a mode is identified by setting a flag of a mode from a start to an end of that mode.

The selecting means 22 has a function of selecting a control method of the suction valves 7 based on the mode information supplied from the mode identifying means 21 and the map (see FIG. 6) stored in the storage unit 23. More specifically, if the mode information indicates the brake assist control mode or the vehicle behavior control mode, the selecting means 22 sets a control method variable F to "0" (which corresponds to the responsivity priority control) based on the map to select the responsivity priority control.

If the mode information indicates the automatic brake control mode or the automatic hold control mode, the selecting means 22 sets the control method variable F to "1" (which corresponds to the intermediate control) based on the map to select the intermediate control. If the mode information indicates the initial diagnosis control mode or the cavitation elimination control mode, the selecting means 22 sets the control method variable F to "2" (which corresponds to the silence priority control) based on the map to select the silence priority control.

The selecting means 22 outputs the selected value of the control method variable F to the suction valve control means 24.

The suction valve control means 24 has a function of increasing or decreasing the drive currents applied to the suction valves 7 by performing the responsivity priority control, the intermediate control, or the silence priority control according to the value of the variable F supplied from the selecting means 22.

Next, how the control unit 20 operates will be described with reference to FIGS. 7 to 9.

Figure 7:
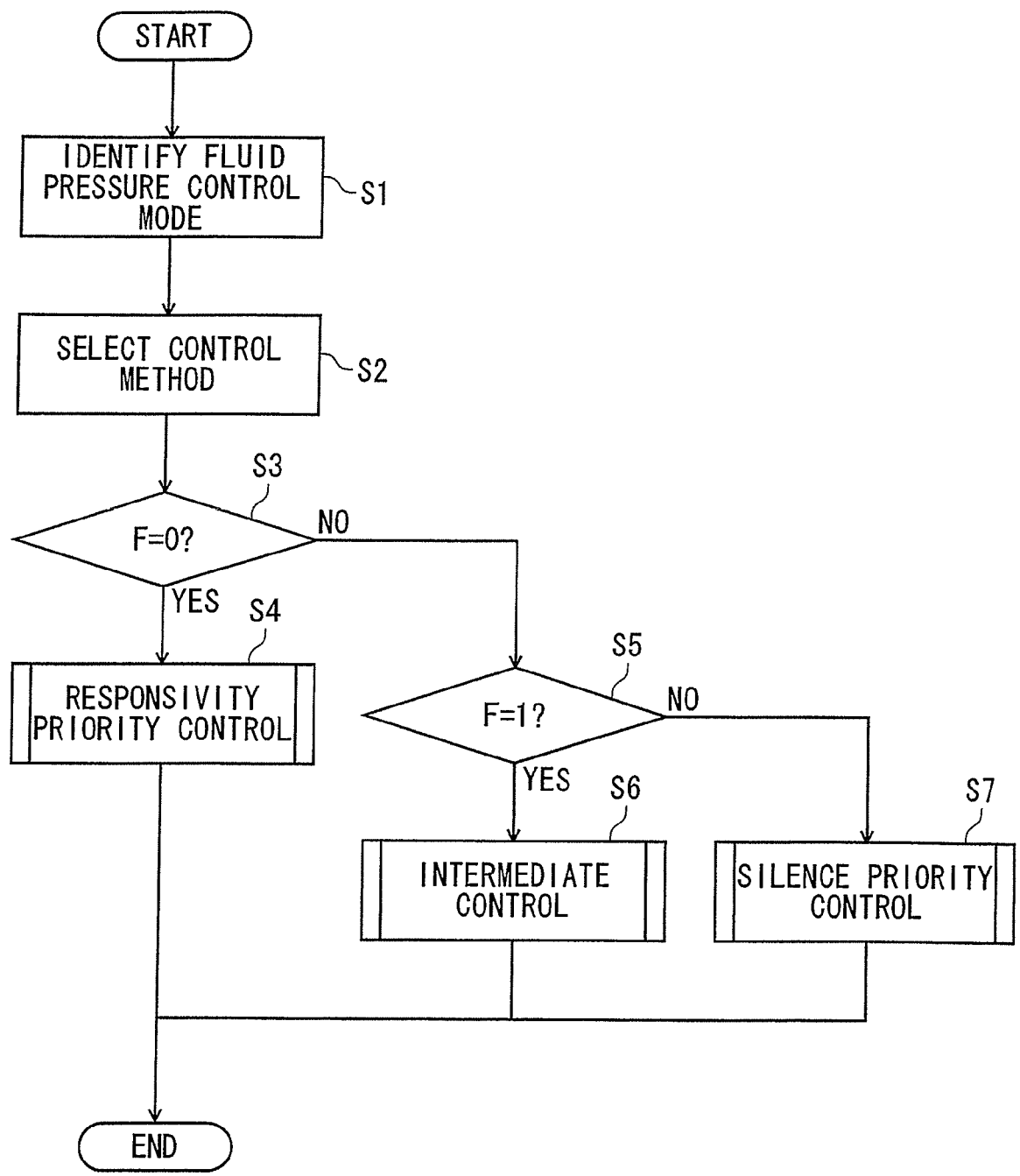
FIG. 7 is a flowchart of a suction valve control process.

As shown in FIG. 7, the control process is started when the control unit 20 receives an opening/closure signal that commands opening or closure of the suction valves 7, whereupon at step S1 the control unit identifies the current fluid pressure control mode. At step S2, the control unit 20 selects a control method based on the identified mode, that is, the control unit 20 substitutes a numerical value corresponding to the identified mode into the control method variable F.

At step S3, the control unit 20 judges whether or not the variable F has a value "0." If the variable F has the value "0" (S3: yes), at step S4 the control unit 20 performs the responsivity priority control. That is, the control unit 20 increases or decreases the drive currents of the suction valves 7 instantaneously by operating them by an ordinary on/off control (see FIG. 3A or 4A). As a result, the suction valves 7 are opened or closed instantaneously as shown in FIG. 3A or 4A.

If the variable F does not have the value "0" (S3: no), at step S5 the control unit 20 judges whether or not the variable F has a value "1." The control unit 20 performs the intermediate control at step S6 if the variable F has the value "1" (S5: yes), and performs the silence priority control at step S7 if not (S5: no).

Next, the silence priority control and the intermediate control will be described in detail. In the following, only a control which is performed to open the suction valves 7 will be described in detail and a control which is performed to close the suction valves 7 will be described briefly without using any drawings because the latter control is similar to the former control.

Figure 8:
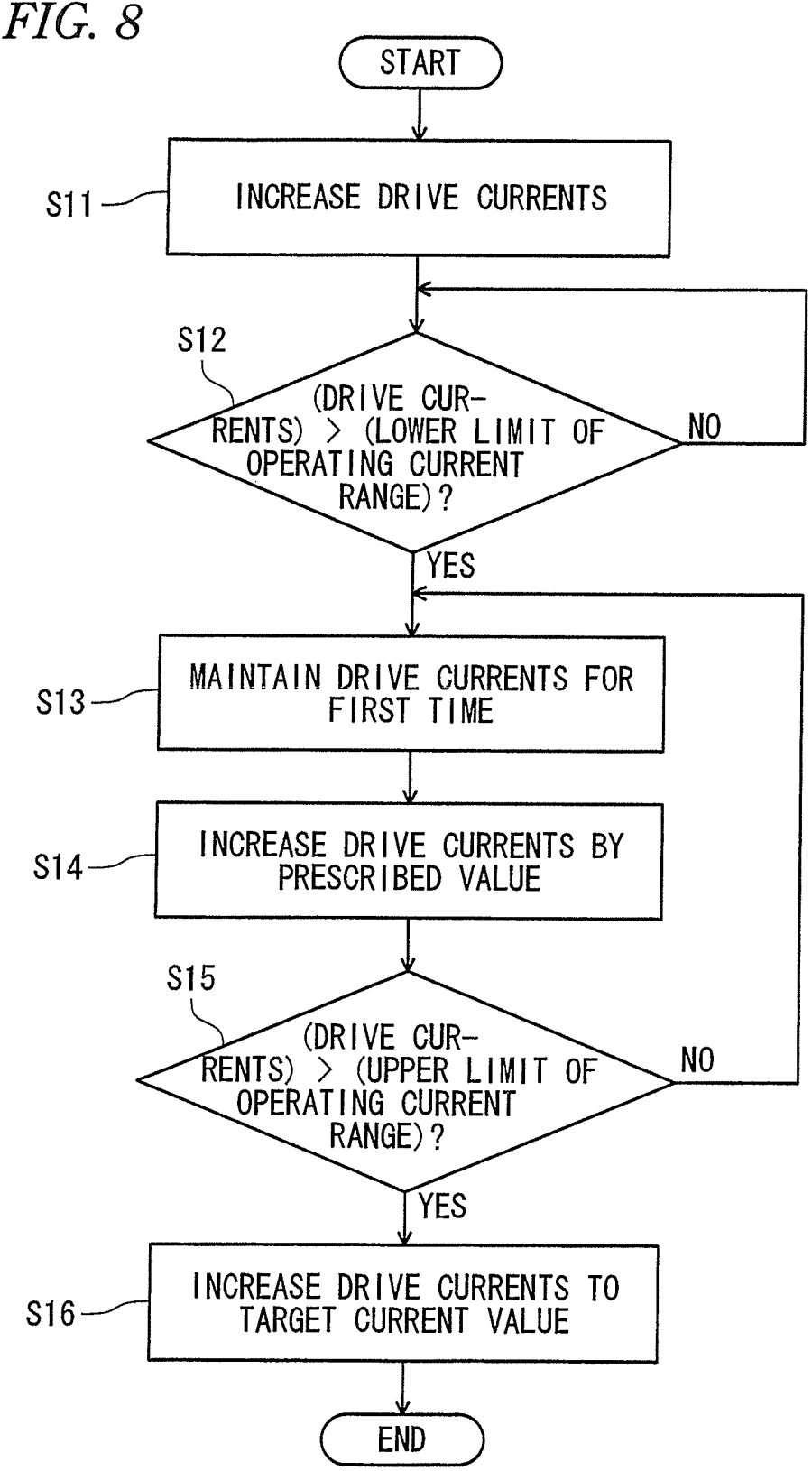
FIG. 8 is a flowchart of a control process for opening the suction valves by a silence priority control.

To open the suction valves 7 by the silence priority control, the control unit 20 operates according to a flowchart shown in FIG. 8. Specifically, first, at step S11, the control unit 20 starts supply of drive currents to the suction valves 7 by turning on a switch (not shown) and thereby increases the drive current instantaneously. At step S12, the control unit 20 judges whether or not the drive currents have exceeded the lower limit value C2 of the operating current range C2-C3.

If judging that the drive currents have exceeded the lower limit value C2 (S12: yes), at step S13 the control unit 20 turns off the switch and maintains the drive currents for a first time. At step S14, the control unit 20 increases the drive currents by a prescribed value.

Figure 3B:
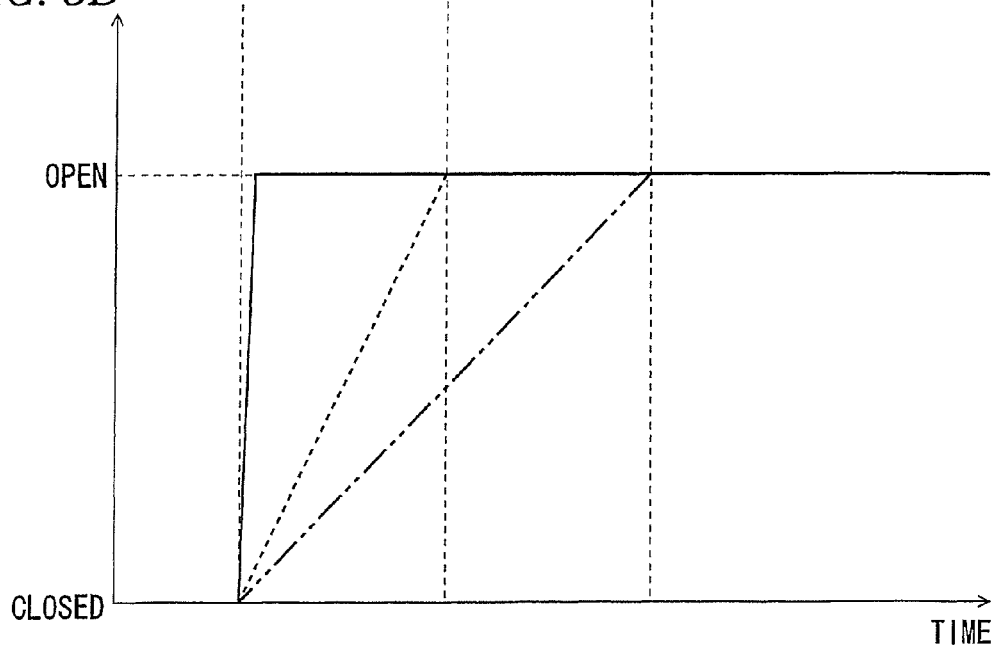

At step S15, the control unit 20 judges whether or not the drive currents have exceeded the upper limit value C3 of the operating current range C2-C3. If judging that the drive currents are smaller than the upper limit value C3 (S15: no), the control unit 20 executes steps S13 and S14 again. That is, the control unit 20 increases the drive currents at the second slope by performing an on/off control until the drive currents exceed the upper limit value C3. As a result, in the silence priority control, as indicated by a two-dot chain line in FIG. 3B, the suction valves 7 are opened more slowly than in the responsivity priority control (solid line) and the intermediate control (broken line), whereby hammering sounds can be suppressed sufficiently.

If judging that the drive currents have exceeded the upper limit value C3 (S15: yes), at step S16 the control unit 20 increases the drive currents to the target current value C1 instantaneously.

Figure 9:
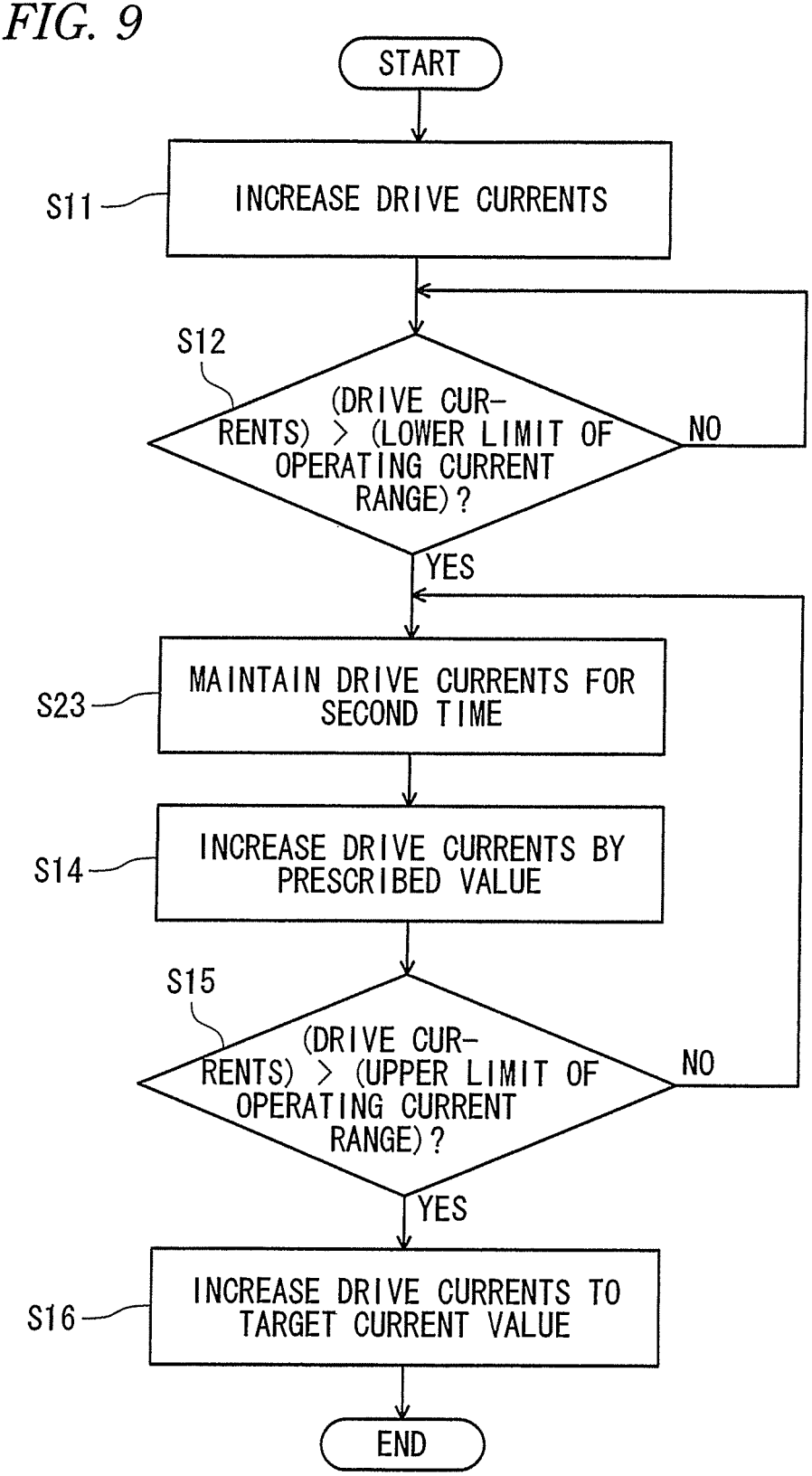
FIG. 9 is a flowchart of a control process for opening the suction valves by an intermediate control.

To open the suction valves 7 by the intermediate control, the control unit 20 operates according to a flowchart shown in FIG. 9. Specifically, the flowchart of FIG. 9 is different from the flowchart of FIG. 8 in that the "first time" used in step S13 of the flowchart of FIG. 8 is replaced by a "second time" (which is shorter than the first time) in step S23 of the flowchart of FIG. 9 and the other steps S11, S12, and S14-S16 remain the same. According to the control process of FIG. 9, in the intermediate control, as indicated by the broken line in FIG. 3A, the drive currents can be increased at the third slope which is gentler than the first slope of the responsivity priority control (solid line) and steeper than the second slope of the silence priority control (two-dot chain line). As a result, in the intermediate control, as indicated by a broken line in FIG. 3B, the suction valves 7 are opened more slowly than in the responsivity priority control (solid line) and faster than in the silence priority control (two-dot chain line), whereby a good control in which responsivity and silence are well balanced can be performed.

Figure 4B:
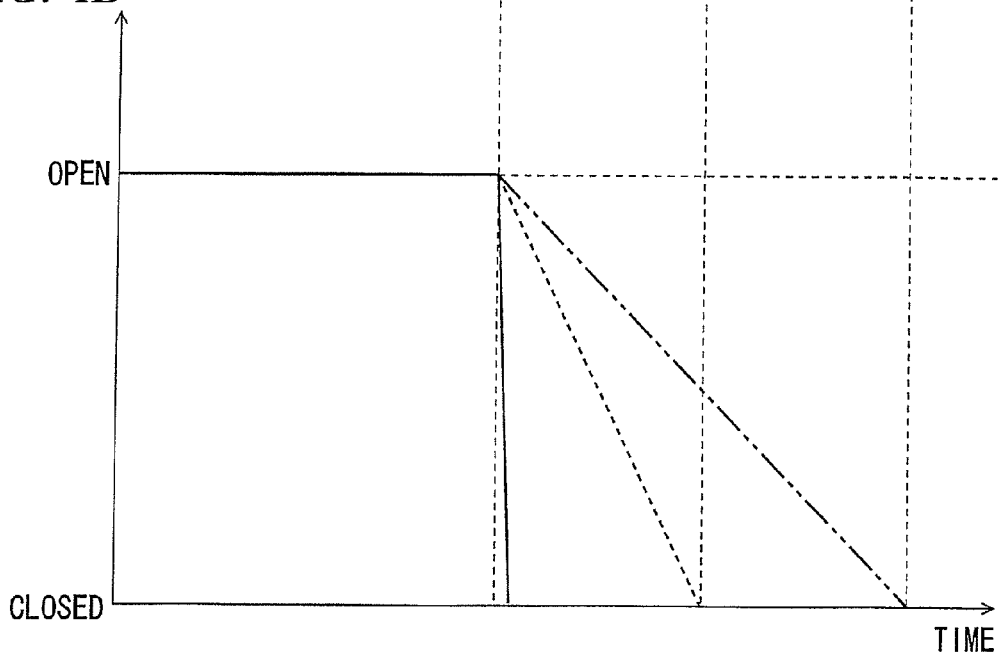

To close the suction valves 7 by the silence priority control or the intermediate control, the control unit 20 operates according to a flowchart which is obtained by somewhat modifying the flowchart of FIG. 8 or 9. More specifically, the flowcharts for closing the suction valves 7 are obtained by changing the term "increase" in the flowcharts of FIGS. 8 and 9 to "decrease," changing step S12 "(drive currents)>(lower limit of operating current range)?" to "(drive currents)<(upper limit of operating current range)?," changing step S15 "(drive currents)>(upper limit of operating current range)?" to "(drive currents)<(lower limit of operating current range)?," and changing the term "target current value" used in step S16 to "0." According to such a control process, in the silence priority control, as indicated by a two-dot chain line in FIG. 4B, the suction valves 7 are closed more slowly than in the responsivity priority control (solid line) and the intermediate control (broken line), whereby hammering sounds can be suppressed sufficiently. In the intermediate control, as indicated by a broken line in FIG. 4B, the suction valves 7 are closed more slowly than in the responsivity priority control and faster than in the silence priority control, whereby a good control in which responsivity and silence are well balanced can be performed.

The above-described embodiment provides the following advantages.

Since switching is made between the responsivity priority control, the silence priority control, and the intermediate control according to what fluid pressure control mode is effective, in a running state in which the driver does not perform a brake manipulation as in, for example, the initial diagnosis control mode (the driver cannot recognize a reason for hammering sounds) and high responsivity is not required, the suction valves 7 are opened or closed silently and hence hammering sounds can be suppressed.

If the fluid pressure control mode is the brake assist control mode or the vehicle behavior control mode (the emergency level is high), the responsivity priority control is performed. As a result, the brake assist control or the vehicle behavior control can be performed properly by setting the responsivity high.

If the fluid pressure control mode is the initial diagnosis control mode or the cavitation elimination control mode (the initial diagnosis control and the cavitation elimination control are performed automatically even if the driver does not perform a brake manipulation), the suction valves 7 are opened or closed silently by performing the silence priority control. Therefore, the driver can be prevented from feeling uncomfortable.

If the fluid pressure control mode is the automatic brake control mode or the automatic hold control mode (the emergency level is lower than in the brake assist control mode and higher than in the initial diagnosis control mode), the intermediate control is performed and hence a good control in which responsivity and silence are well balanced can be performed.

The invention is not limited to the above embodiment can be implemented in various modes as described below.

Although in the embodiment the controls according to the invention are applied to the suction valves 7, the invention is not limited to such a case and the controls according to the invention may be applied to other normally closed electromagnetic valves such as the outlet valves 2. The fluid pressure control modes are not limited to the ones used in the embodiment and may be any modes.

In the embodiment, in the silence priority control and the intermediate control, the drive currents are increased or decreased instantaneously outside the operating current range C2-C3 or C4-C5. However, the invention is not limited to such a case. For example, the drive currents may be increased or decreased at the second slope or the third slope even outside the operating current range. In the embodiment, in the silence priority control and the intermediate control, the drive currents are increased or decreased stepwise in the operating current range C2-C3 or C4-C5. However, the invention is not limited to such a case. For example, the drive currents may be increased or decreased at a constant slope (i.e., linearly) in the operating current range.

What is claimed is:

1. A vehicular brake fluid pressure control apparatus comprising:
    plural normally open electromagnetic valves and plural normally closed electromagnetic valves which are disposed so as to correspond to plural wheel brakes; and
    a control unit which controls fluid pressures transmitted to the wheel brakes by controlling drive currents applied to at least part of the electromagnetic valves according to plural different fluid pressure control modes,
    wherein the control unit controls the at least part of the normally closed electromagnetic valves while switching, according to the current fluid pressure control mode, between
        a responsivity priority control in which drive currents applied to the at least part of the normally closed electromagnetic valves are increased to a target current value instantaneously at a first slope, the target current value being larger than an upper limit of a prescribed operating current range in which the normally closed electromagnetic valves are supposed to be opened;
        a silence priority control in which the drive currents applied to the at least part of the normally closed electromagnetic valves are increased at a second slope which is gentler than the first slope; and
        an intermediate control in which the drive currents applied to the at least part of the normally closed electromagnetic valves are increased at a third slope which is gentler than the first slope and steeper than the second slope,
    in the silence priority control, the control unit increases the drive currents gradually at the second slope in the prescribed operating current range and increases the drive currents instantaneously from a state where the drive currents do not flow to a lower limit of the prescribed operating current range and from the upper limit of the prescribed operating current range to the target current value, and
    in the intermediate control, the control unit increases the drive currents gradually at the third slope in the prescribed operating current range and increases the drive currents instantaneously from the state where the drive currents do not flow to the lower limit of the prescribed operating current range and from the upper limit of the prescribed operating current range to the target current value.

2. The vehicular brake fluid pressure control apparatus according to claim 1, further comprising:
    pumps which pressurize the wheel brakes; and
    a master cylinder,
    wherein the normally closed electromagnetic valves are suction valves which are disposed between the master cylinder and suction sides of the pumps, respectively.

3. The vehicular brake fluid pressure control apparatus according to claim 2, wherein the control unit performs the responsivity priority control if the current fluid pressure control mode is a brake assist control mode for increasing fluid pressures exerted on the wheel brakes at the time of emergency braking or a vehicle behavior control mode for stabilizing vehicle behavior.

4. The vehicular brake fluid pressure control apparatus according to claim 2, wherein the control unit performs the silence priority control if the current fluid pressure control mode is an initial diagnosis control mode for checking operations of components of the vehicular brake fluid pressure control apparatus or a cavitation elimination control mode for eliminating cavitation occurring between the pumps and the suction valves.

5. The vehicular brake fluid pressure control apparatus according to claim 2, wherein the control unit performs the intermediate control if the current fluid pressure control mode is an automatic brake control mode in which control is performed according to a distance to a vehicle ahead or an automatic hold control mode for automatically holding fluid pressures exerted on the wheel brakes while the vehicle is stopped.

6. The vehicular brake fluid pressure control apparatus according to claim 1, wherein the control unit increases the drive currents stepwise in the prescribed operating current range in each of the silence priority control and the intermediate control.

7. The vehicular brake fluid pressure control apparatus according to claim 6, wherein the stepwise current comprises increasing the drive currents by repeating a set of level holding and increasing steps.

8. The vehicular brake fluid pressure control apparatus according to claim 1, wherein the second slope is an average slope of the drive currents in the prescribed operating current range.

9. The vehicular brake fluid pressure control apparatus according to claim 8, wherein the third slope is an average slope of the drive currents in the prescribed operating current range.

10. The vehicular brake fluid pressure control apparatus according to claim 1, wherein the plural different fluid pressure control modes comprise:
    a brake assist control mode configured to increase the fluid pressures exerted on the plural wheel brakes at time of emergency braking;
    a vehicle behavior control mode configured to stabilize behavior of a vehicle;
    an automatic brake control mode configured to automatically increase the fluid pressures exerted on the plural wheel brakes according to a distance to another vehicle;
    an automatic hold control mode configured to automatically maintain the fluid pressures exerted on the plural wheel brakes while the vehicle is stopped;
    an initial diagnosis control mode configured to check operations of components of the vehicular brake fluid pressure control apparatus while the vehicle is running; and
    a cavitation elimination control mode configured to eliminate cavitation occurring between pumps and the normally closed electromagnetic valves.

11. The vehicular brake fluid pressure control apparatus according to claim 10, wherein the control unit comprises:
    a mode identifying mechanism configured to identify the current fluid pressure control mode and output information of the identified current fluid pressure control mode;
    a selecting mechanism configured to set a variable based on the information output from the mode identifying mechanism; and
    a valve control mechanism configured to increase the drive currents applied to the plural normally closed electromagnetic valves by performing the responsivity priority control, the intermediate control, or the silence priority control according to the variable supplied from the selecting mechanism.

12. The vehicular brake fluid pressure control apparatus according to claim 11, wherein:
    the selecting mechanism sets the variable to "0" which corresponds to the responsivity priority control when the information indicates the brake assist control mode or the vehicle behavior control mode;
    the selecting mechanism sets the variable to "1" which corresponds to the intermediate control when the information indicates the automatic brake control mode or the automatic hold control mode; and
    the selecting mechanism sets the variable to "2" which corresponds to the silence priority control when the information indicates the initial diagnosis control mode or the cavitation elimination control mode.

13. The vehicular brake fluid pressure control apparatus according to claim 1, wherein:
    the control unit identifies a current fluid pressure control mode and selects a control method based on the identified mode by substituting a numerical value corresponding to the identified current fluid pressure control mode into a variable;
    if the variable has a value "0," the control unit performs the responsivity priority control;
    if the variable does not have the value "0", the control unit judges whether or not the variable has a value "1" and, if determining that the variable has the value "1," the control unit performs the intermediate control; and
    if the variable does not have the value "1", the control unit performs the silence priority control.

14. The vehicular brake fluid pressure control apparatus according to claim 13, wherein, in the silence priority control:
    the control unit judges whether or not the drive currents have exceeded a lower limit value and an upper limit value of an operating current range in which the normally closed electromagnetic valves are supposed to be opened;
    if the drive currents have exceeded the lower limit value and are smaller than the upper limit value, the control unit maintains the drive currents for a first time and increases the drive currents by a prescribed value; and
    if the drive currents have exceeded the upper limit value, the control unit increases the drive currents to the target current value instantaneously.

15. The vehicular brake fluid pressure control apparatus according to claim 14, wherein if the drive currents have exceeded the lower limit value and are smaller than the upper limit value in the silence priority control, the control unit increases the drive currents at the second slope by performing an on/off control until the drive currents exceed the upper limit value such that the normally closed electromagnetic valves are opened more slowly than in the responsivity priority control and the intermediate control.

16. The vehicular brake fluid pressure control apparatus according to claim 15, wherein if the drive currents have exceeded the lower limit value and are smaller than the upper limit value in the intermediate control, the control unit maintains the drive currents for a second time, which is shorter than the first time, and increases the drive currents by the prescribed value.

17. A vehicular brake fluid pressure control apparatus comprising:
    plural normally open electromagnetic valves and plural normally closed electromagnetic valves which are disposed so as to correspond to plural wheel brakes; and
    a control unit which controls fluid pressures transmitted to the wheel brakes by controlling drive currents applied to at least part of the electromagnetic valves according to plural different fluid pressure control modes,
    wherein the control unit controls the at least part of the normally closed electromagnetic valves while switching, according to the current fluid pressure control mode, between
        a responsivity priority control in which drive currents applied to the at least part of the normally closed electromagnetic valves are decreased to a target current value instantaneously at a first slope, the target current value being smaller than a lower limit of a prescribed operating current range in which the normally closed electromagnetic valves are supposed to be closed;
        a silence priority control in which the drive currents applied to the at least part of the normally closed electromagnetic valves are decreased at a second slope which is gentler than the first slope; and
        an intermediate control in which the drive currents applied to the at least part of the normally closed electromagnetic valves are decreased at a third slope which is gentler than the first slope and steeper than the second slope, in the silence priority control, the control unit decreases the drive currents gradually at the second slope in the prescribed operating current range and decreases the drive currents instantaneously from a value larger than an upper limit of the prescribed operating current range to the upper limit of the prescribed operating current range and from the lower limit of the prescribed operating current range to the target current value, and in the intermediate control, the control unit decreases the drive currents gradually at the third slope in the prescribed operating current range and decreases the drive currents instantaneously from the value larger than the upper limit of the prescribed operating current range to the upper limit of the prescribed operating current range and from the lower limit of the prescribed operating current range to the target current value.

18. The vehicular brake fluid pressure control apparatus according to claim 17, wherein the control unit decreases the drive currents stepwise in the prescribed operating current range in each of the silence priority control and the intermediate control.

\* \* \* \* \*